US 6,565,710 B2

(12) United States Patent
Salow et al.

(10) Patent No.: US 6,565,710 B2
(45) Date of Patent: May 20, 2003

(54) FILTER MATERIAL WITH FLAVORING AND FLAVOR-PROTECTING PROPERTIES AND A PROCESS FOR ITS PRODUCTION

(75) Inventors: Hartmut Salow, Forbach (DE); Brigitte Herhut, Gaggenau (DE)

(73) Assignee: Papcel-Papter und Cellulose, Technologie und Handels-GmbH (DE)

( * ) Notice: Subject to any disclaimer, the term of this patent is extended or adjusted under 35 U.S.C. 154(b) by 0 days.

(21) Appl. No.: 09/853,545

(22) Filed: May 10, 2001

(65) Prior Publication Data

US 2002/0095910 A1 Jul. 25, 2002

(30) Foreign Application Priority Data

May 12, 2000 (DE) .......................................... 100 23 462

(51) Int. Cl.[7] .......................... D21F 17/18; D21F 17/20
(52) U.S. Cl. ........................ 162/175; 162/185; 162/129; 426/84
(58) Field of Search ................. 131/274, 276, 131/277, 332, 365, 334, 335; 604/359; 162/125, 127, 129, 132, 139, 146, 157.1, 157.3, 158, 160, 173, 175, 179, 180, 183–185; 426/594, 78, 597, 84; 427/394–396; 435/97

(56) References Cited

U.S. PATENT DOCUMENTS

| 3,288,146 A | * | 11/1966 | Bavley | 131/274 |
| 3,453,257 A | * | 7/1969 | Parmerter | 131/355 |
| 3,528,819 A | * | 9/1970 | Hamilton | 426/594 |
| 5,144,964 A | * | 9/1992 | Demain | 131/275 |
| 5,173,154 A | * | 12/1992 | Heinrich | 162/129 |
| 5,429,628 A | * | 7/1995 | Trinh et al. | 604/359 |
| 5,479,949 A | * | 1/1996 | Battard et al. | 131/353 |

FOREIGN PATENT DOCUMENTS

| EP | 0 251 132 | * | 1/1988 | D21D/3/00 |
| HU | 509/85 | | 9/1985 | |
| JP | 57-185372 | * | 11/1982 | C09J/7/02 |
| JP | 62-236440 | * | 10/1987 | A23B/7/14 |
| JP | 10-279986 | * | 10/1998 | C11B/9/00 |
| WO | WO 97/33044 | | 9/1997 | |

* cited by examiner

Primary Examiner—Steven P. Griffin
Assistant Examiner—Eric Hug
(74) Attorney, Agent, or Firm—Pennie & Edmonds, LLP

(57) ABSTRACT

A filter material is described that is coated with cyclodextrins charged with taste substances, whereby the filter material also has 1 to 99% uncharged cyclodextrins, as well as a process for its production.

16 Claims, 2 Drawing Sheets

FILTER MATERIAL WITH FLAVORING AND FLAVOR-PROTECTING PROPERTIES AND A PROCESS FOR ITS PRODUCTION

The present invention concerns a filter material that has both outstanding flavoring properties and outstanding flavor-protecting properties, as well as a process for producing it.

The production of filter materials for cold and hot filtration, e.g. tea bags, coffee bags, filter bags for flavors and/or spices, and filter papers for tea or coffee for the beverage industry is known in the relevant technical field.

In general, filter materials are produced in this case from natural fibers or a combination of natural fibers and synthetic fibers in a way known in the relevant technical field, using a paper machine.

In this case, in a first stage, an aqueous suspension of natural fibers is applied to a paper-machine screen, after which the slurry is led through first water-removal chambers. At this time, a first fiber layer, of natural fibers, is formed on the moving screen.

In the case of production of a paper that can be hot-sealed from both natural fibers and synthetic fibers, the hot-sealable synthetic fibers are then added in a second stage in the form of a second suspension, as the paper-machine screen is moved further, through second water-removal chambers, at which time a second layer, of synthetic fibers, is deposited on the first layer through the second water-removal chambers.

As the paper-machine screen with the two fiber layers, one on top of the other, is moved further, a drying then takes place, whereby the synthetic fibers can be melted into the first fiber layer, so they can bind to the natural fibers of the first layer. In this case, a partial penetration of the two layers can take place.

In addition, tea filter papers are known in the relevant technical field that have a flavoring effect on the infusion from tea bags produced from this material (Hungarian patent application 509/85, inventors: J. Szejtli, M. Szejtli, and L. Szente). For this, tea filter papers with aromatic oils such as peppermint oil, bergamot oil, lemon oil, jasmine oil, or other oils involving charged beta-cyclodextrins are used, whereby the charged beta-cyclodextrins are applied to the filter paper in combination with special liquid binders, such as, e.g., dextran, acryl dextrin or polyvinyl alcohol, and bound there.

Packaging materials are known from WO 97/33044 into/onto which the cyclodextrins are worked or applied by a special paint or lamination. The cyclodextrins serve in this case to prevent harmful substances from penetrating. Flavor protection by these packaging materials of substances packaged in these packaging materials is not mentioned. The task of the present invention is, therefore, to provide filter papers that not only have outstanding flavoring properties but also outstanding flavor-protecting properties.

Another task of the present invention is to provide a process for the production of this paper.

The object of the present invention is a filter material that is coated with cyclodextrins charged with flavorings, whereby the filter material is characterized by the fact that the filter material also has 1 to 99% uncharged cyclodextrins.

Other advantageous embodiments are presented in the claims.

Another object of the present invention is a process for the production of a filter material of this kind, characterized by the fact that the filter material is coated with both charged and uncharged cyclodextrins.

The present invention is based in this case on the recognition that flavoring or flavor-protection properties can be provided through a combination of charged and uncharged cyclodextrin molecules on or in the filter material.

Without wanting to be bound to any theory, the inventors of the present invention assume specifically that during storage flavor components can escape from filling material, for example tea, packaged in the filter material according to the invention, so that the taste quality of the filling material is worsened for later usage.

By providing uncharged cyclodextrins in the filter material, these flavorings are captured before leaving the filter material and retained in the filter material until the filter material containing the filling material is to be used. At this time, the cyclodextrins that have become charged during the course of storage and also those that were already charged when the filter material was produced release the taste substances, whereby the quality of the infusion is strongly improved.

Thus, according to the invention, it is also possible to give the filling material, while preserving its original taste, an improved taste in a desired manner, for example in regard to a taste accent.

Thus, for example, the filling material can be given a flavor accent such as, e.g., "flowery," "fresh," "round," "soft," "full," etc., or a mixture of these individual accents.

In this way, it is possible to make use, for example, of a filling material of lower quality, e.g. a middle-class tea, by providing the correct taste ingredient that was originally missing.

Thus, according to the invention, taste substances can be used, for example to improve the tea taste of substances, such as: n-hexanal, linalool, trans-2-hexenal, cis-3-hexen-1-ol, phenylacetaldehyde, n-pentanol, 1-penten-3-ol, trans-2-pentenal, 2-methyl propanal, or ethyl vanillin.

The cyclodextrins used according to the invention can involve cyclodextrins known in the relevant technical field (cf., for example, WO 97/33044, pages 12 through 19).

Cyclodextrins are, by their chemical type, oligosaccharides of at least 5 glucopyranose units connected through $\alpha(1\rightarrow 4)$ bonds. Although cyclodextrins with up to 12 glucopyranose units are known, in most cases $\alpha$-, $\beta$-, or $\gamma$-cyclodextrins with 6, 7, or 8 glucopyranose units are used.

Thus, according to the invention, $\alpha$-, $\beta$-, or $\gamma$-cyclodextrins or any mixture thereof is used preferably. In an especially preferred embodiment according to the present invention, the cyclodextrins used involve $\beta$- and/or $\gamma$-cyclodextrins. For purposes of use according to the invention, we can use, in addition to underived cyclodextrins, also derivatives thereof, such as, e.g., trimethyl beta-cyclodextrin, dimethyl beta-cyclodextrin, hydroxyethyl beta-cyclodextrin, and/or hydroxypropyl beta-cyclodextrin.

The proportion of charged cyclodextrins, according to the invention, is generally 1 to 99%, more appropriately 3 to 80% and advantageously 5 to 30% of the total cyclodextrins present in the filter material. Thus, consequently, the proportion of uncharged cyclodextrins is generally 99 to 1%, more appropriately 97 to 20%, and advantageously 95 to 70% of the total cyclodextrins present in the filter material.

The total amount of the cyclodextrins included on or in the filter material is, according to the invention, generally 0.01 to 10 wt %, more appropriately 0.1 to 5 wt %, and advantageously 0.1 to 2 wt %, with respect to the weight of all solid matter forming the filter material.

The filter material according to the invention generally has a surface weight between 8 and 90 $g/m^2$ and advantageously a surface weight between 10 and 25 $g/m^2$.

The filter material according to the invention can consist, as explained above, of natural fibers and/or synthetic fibers. Natural fibers can involve, for example, fibers from evergreen-cell material and or abaca fibers. The first layer generally consists primarily of, preferably 60 to 90% of, natural fibers. If a hot-sealable filter material is to be produced according to the invention, a second layer consisting primarily of, preferably 10 to 40% of, sealable polymer fibers can be applied to the first layer.

The filter material according to the invention can be used in a preferred manner for the production of filter bags, likewise hot-sealable, for hot and/or cold filtration, as well as for the production of tea bags, coffee bags, and/or spice bags.

In the following, another aspect of a process representing the present invention will be described for the production of the filter material according to the invention. For illustration in this case, the process according to the invention will be explained in more detail with reference to the attached diagrams, with the example of a two-layer filter material.

The production process according to the invention is not, however, limited to this process, but can also be used in a similar manner for the production of one-layer filter materials.

BRIEF DESCRIPTION OF THE DRAWINGS

In FIG. 1, the formation of the filter material according to the invention is shown in a schematic representation. In this case, the formation of a first fiber layer, from natural fibers 1 is shown in FIG. 1a) and the formation of a second fiber layer, with synthetic, hot-sealable fibers 2. The second layer of fibers 2 is thus formed by being deposited onto the first layer, which consists of natural fibers 1. In the diagram, the natural fibers 1 are hatched horizontally, while the synthetic fibers 2 are hatched approximately vertically, to differentiate them.

FIG. 1b) shows how by removing water from the two layers as described, especially the second layer with fibers 2, a partial penetration of the two layers is achieved, so that the synthetic fibers 2 come between the natural fibers 1.

Figure 1:
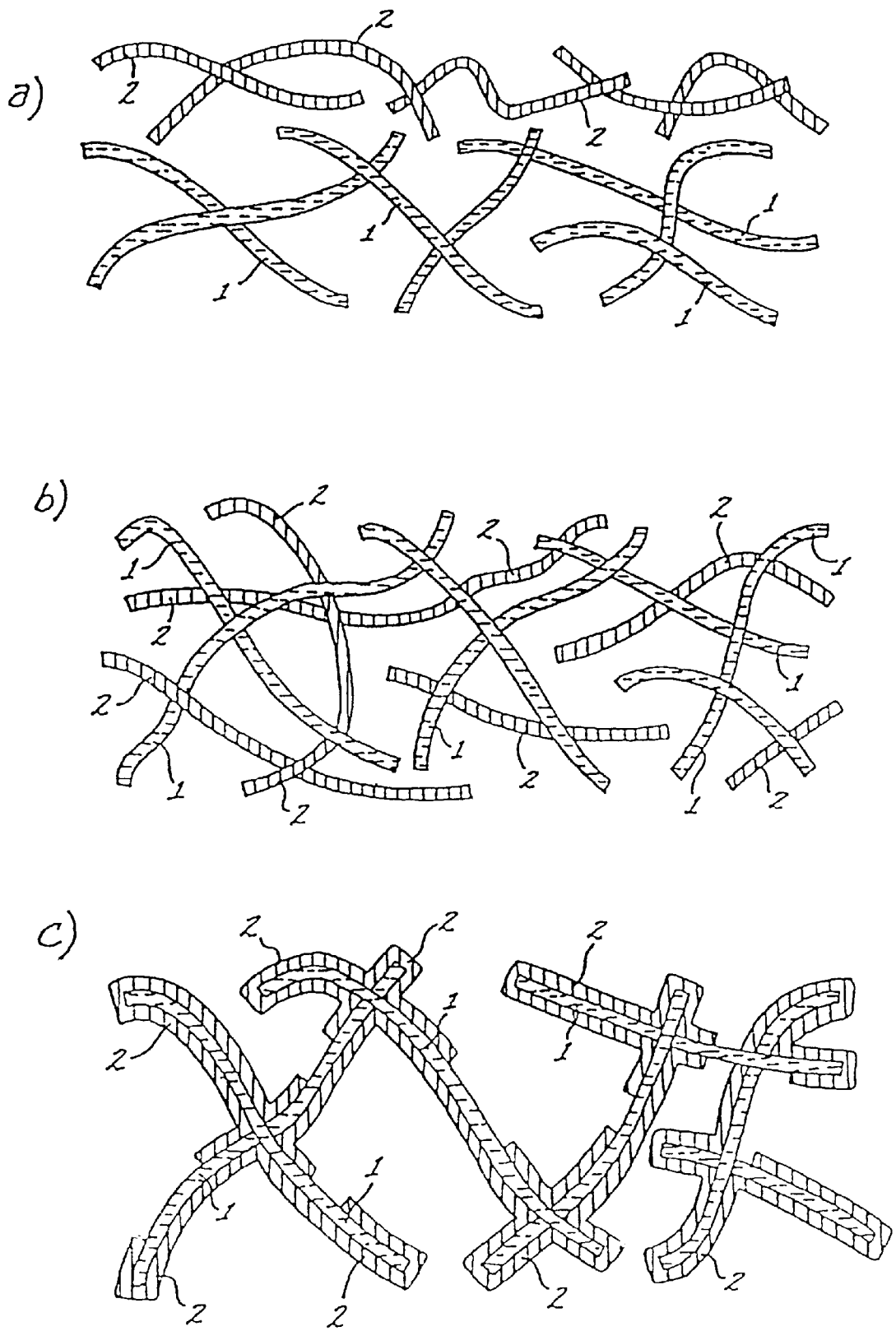
FIG. 1 shows the various stages in the formation of the filter material according to the invention from natural fibers and synthetic fibers, with the example of using a paper machine, in a general, roughly schematic representation.

In another production step, the partially penetrating layers 1 and 2 are dried and thereby heated in such a way that the synthetic fibers 2 melt and lie around fibers 1 during the resolidification, so that they are at least partially enclosed. The filter material has thus become hot-sealable (FIG. 1c).

Figure 2:
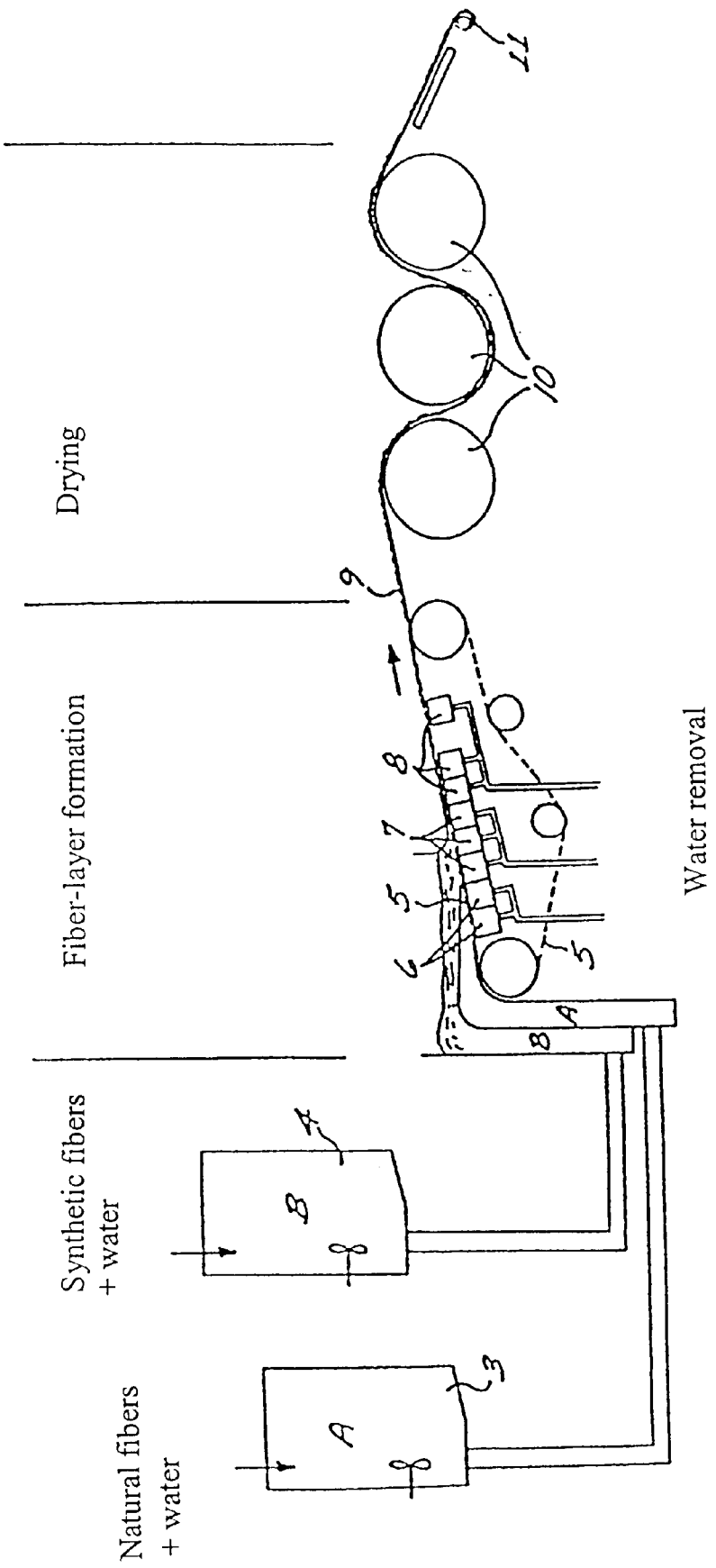
FIG. 2 shows the basic structure of a paper machine, as it can be used to produce a filter material according to the invention.

FIG. 2 shows the basic structure of a paper machine, as it can be used to produce a filter material according to the invention. First, a suspension A is produced from ground natural fibers, possibly with a proportion of other fibers, and water. According to one embodiment of the present invention, this suspension A can also include charged and/or uncharged cyclodextrin molecules in the quantity given above. For this, the charged and/or uncharged cyclodextrins are added to suspension A, possibly together with the taste substances to be used.

A suspension B is also produced, which possibly includes a proportion of natural fibers, heat-sealable polymer fibers, and water. In another embodiment of the present invention, this suspension B can include charged and/or uncharged cyclodextrin molecules, either in addition to or instead of suspension A, in accordance with the above explanations.

These two suspensions, A and B, are led from the corresponding containers (3 and 4) through the so-called head box of the paper machine. This has essentially a rotating screen (5), which is moved through a number of water-removal chambers (6, 7, and 8).

Through suitable tube lines and pump devices, not shown in more detail, the suspension A is led to the screen 5, through the first two water-removal chambers 6, whereby the water is suctioned away through the chambers 6 and the water-removal line. At this time, a first fiber layer is formed on the moving screen 5 from the natural fibers 1. As the screen 5 is moved further through the water-removal chambers 7, the second suspension, B, is added, whereby the second layer, of synthetic fibers, is deposited onto the first layer. Water is then removed through the water-removal line. As the screen 5 is moved further, a water removal is performed on the two fiber layers, one on top of the other, by which means the two layers partially penetrate one another. By setting the water removal appropriately, the penetration can be more or less strong.

The material 9, of natural fibers and synthetic fibers, that has now been formed is now taken away from the screen and a drying is performed. This drying can take place in various ways and manners, e.g. by contract drying or flow-through drying.

Elements 10 now give only a rough schematic indication of the corresponding drying elements.

In FIG. 2, drying cylinders 10 are shown, through which the formed paper web is dried in the contact process. However, it is also practicable to lead the formed paper web over only one cylinder and dry it with hot air, without the web lying on this cylinder.

Warming of the two-layer fiber material causes the synthetic fibers 2 to melt into the mixed layer 9. During the resolidification at the output of the drying station, the synthetic fibers surround the natural fibers, at least partially, and the hot-sealable filter material is rolled onto a roll 11.

In order to coat the filter material with charged and/or uncharged cyclodextrins, within the framework of the process according to the invention, various process stages are offered during the production process as places for adding the cyclodextrins:

1) The cyclodextrins can be added, for example, to the pulp before the material starts to run through the paper machine. In this case, charged and/or uncharged cyclodextrins and the taste substances constituting the charge can be added separately to the material flow.
2) In addition, the taste substances and/or the uncharged cyclodextrins can be added in the sizing (aqueous solution, emulsion, dispersion) press during the production process.
3) There is also a possibility of adding within the framework of additional process stages, e.g. at the spray beams or at the moistening device at the end of the production process. This also applies similarly to charging the cyclodextrins with taste substances.

It is also true here that the cyclodextrins can be charged with the taste substances in a molar ratio that can be determined and set precisely in a simple manner.

The filter material according to the invention is preferably usable in the production of tea bags. The object of a preferred embodiment of the present invention is consequently a tea bag produced from the filter material according to the invention.

The following examples should serve to illustrate further the present invention. It is obvious, however, that the examples do not restrict the present invention in the least.

So-called two-chamber bags are prepared from a tea-bag paper with a paper weight of about 0.2 g. The tea-bag paper used involves a commercially common non-heat-sealable paper (surface weight 12.2 g/m$^2$), as is used in the relevant technical field to produce this double-chamber bag. This tea-bag paper is then coated with γ-cyclodextrins in a quantity of 15 mg/kg, whereby 9% of the γ-cyclodextrins were charged with the taste substance linalool. The quantity of linalool added per bag was thus 1.0, 1.5, or 2.0 ppm (see examples 1, 2, and 3).

Then these bags were each filled with 2.0 g of black tea. The individual bags were brewed and allowed to simmer for 2 minutes. Then a taste test took place with a group of volunteer experts.

A tea bag of untreated tea-bag paper served as a comparison sample.

|  |  | Example 1 | Example 2 | Example 3 | Comparison example 1 |
|---|---|---|---|---|---|
| Additive CAVAMAX W8 | 9% linalool |  |  |  |  |
| Quantity added per bag | ppm | 1.0 | 1.5 | 2.0 | 0 |
| 2%, dissolved in water | mg | 70 | 105 | 140 | 0 |

The coating solution containing the γ-cyclodextrins and the taste substance linalool was produced at 35° C., 250 minutes in an ultrasound bath.

Results of the Evaluation

The test subjects evaluated the taste of the tea of examples 1 through 3, starting from the tea serving as comparison example 1, as follows:

Example 1: a pleasant, clear, fresh taste, with a slightly astringent accent;

Example 2: very similar to example 1, but a little lighter in color with a slight citrus taste, quite pleasant;

Example 3: similar to example 1, with a slight citrus taste, color similar to example 1.

It can be seen from this that filter materials according to the invention have outstanding flavoring and flavor-protection properties.

What is claimed is:

1. A filter material comprising a carrier material coated with at least one cyclodextrin, wherein at least one cyclodextrin is charged with at least one taste substance, and wherein the filter material further comprises from about 20% to about 97% of at least one uncharged cyclodextrin with respect to the total quantity of cyclodextrins present.

2. The filter material according to claim 1, wherein the cyclodextrin is selected from β-cyclodextrins, γ-cyclodextrins, and mixtures thereof.

3. The filter material according to claim 2, wherein the β-cyclodextrin is an underived β-cyclodextrin.

4. The filter material according to claim 2, wherein the β-cyclodextrin is a derived β-cyclodextrin.

5. The filter material according to claim 4, wherein the derived β-cyclodextrin is selected from the group consisting of trimethyl-β-cyclodextrin, dimethyl-β-cyclodextrin, hydroxyethyl-β-cyclodextrin, hydroxypropyl-β-cyclodextrin, and mixtures thereof.

6. The filter material according to claim 1, wherein the charge comprises a taste substance selected from the group consisting of n-hexanal, linalool, trans-2-hexenal, cis-3-hexen-1-ol, phenylacetaldehyde, n-pentanol, 1-penten-3-ol, trans-2-pentenal, 2-methyl propanal, and ethyl vanillin.

7. The filter material according to claim 1, wherein the filter material has a surface weight of from about 10 to about 25 g/m$^2$.

8. A process for producing the filter material according to claim 1, comprising applying with an application unit and in the substantial absence of a binder, the at least one cyclodextrin and the at least one taste substance together with water.

9. A process for producing the filter material according to claim 1, comprising applying to the carrier material with a spray beam in the substantial absence of water, the at least one cyclodextrin and the at least one taste substance.

10. A process for producing the filter material according to claim 1 with a paper making machine which comprises the steps of: (1) forming a fiber pulp comprising natural fibers and, optionally, synthetic fibers, and (2) adding to the fiber pulp at least one cyclodextrin and at least one taste substance before the fiber pulp is processed through the paper making machine.

11. A process for producing the filter material according to claim 1 which incorporates an application unit and a drying unit and comprises the steps of: (1) forming a solution comprising uncharged cyclodextrin and at least one taste substance, (2) applying the solution with the application unit, and (3) charging at least a portion of the cyclodextrin with the at least one taste substance in the drying unit.

12. The filter material according to claim 1, wherein the filter material is a filter bag.

13. The filter material according to claim 12, wherein the filter bag is a tea bag, a coffee bag or a spice bag.

14. A filter material comprising a carrier material coated with at least one cyclodextrin, wherein at least one cyclodextrin is charged with at least one taste substance, wherein the filter material further comprises uncharged cyclodextrin, and wherein the proportion of charged cyclodextrin is from about 5% to about 30% with respect to the total quantity of cyclodextrins present.

15. A filter material comprising a carrier material coated with at least one cyclodextrin, wherein at least one cyclodextrin is charged with at least one taste substance, wherein the filter material further comprises from about 1% to about 99% of at least one uncharged cyclodextrin with respect to the total quantity of cyclodextrins present, and wherein the filter material comprises two layers: a first layer comprising natural fibers, and a second layer comprising heat-sealable polymer fibers.

16. A process for producing a filter material comprising a carrier material coated with at least one cyclodextrin, wherein at least one cyclodextrin is charged with at least one taste substance, and wherein the filter material further comprises from about 1% to about 99% of at least one uncharged cyclodextrin with respect to the total quantity of cyclodextrins present which comprises the steps of:

(1) forming a fiber pulp comprising natural fibers and, optionally, synthetic fibers, (2) adding uncharged cyclodextrin to the fiber pulp, and (3) charging at least a portion of the cyclodextrin with the at least one taste substance in a subsequent step.

* * * * *